United States Patent
Pelletier et al.

(10) Patent No.: US 9,542,432 B2
(45) Date of Patent: Jan. 10, 2017

(54) SYSTEMS AND METHODS FOR MULTITENANCY DATA

(75) Inventors: Guy Pelletier, Ottawa (CA); Douglas Clarke, Ottawa (CA)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 13/332,126

(22) Filed: Dec. 20, 2011

(65) Prior Publication Data

US 2013/0086322 A1    Apr. 4, 2013

Related U.S. Application Data

(60) Provisional application No. 61/542,001, filed on Sep. 30, 2011.

(51) Int. Cl.
*G06F 12/00* (2006.01)
*G06F 17/30* (2006.01)

(52) U.S. Cl.
CPC .............. *G06F 17/30371* (2013.01)

(58) Field of Classification Search
CPC .............. G06F 12/0813; G06F 12/0866; G06F 12/0831; G06F 12/0897; G06F 12/0848; G06F 17/30; G06F 9/4435; G06F 17/30557; G06F 21/6218; G06F 21/6227; G06F 17/30607; G06F 17/3061
USPC .......................................................... 711/119
See application file for complete search history.

(56) References Cited

U.S. PATENT DOCUMENTS

| | | |
|---|---|---|
| 5,937,409 A | 8/1999 | Wetherbee |
| 6,134,559 A | 10/2000 | Brumme et al. |
| 6,633,889 B2 | 10/2003 | Dessloch et al. |
| 6,912,520 B2 | 6/2005 | Hankin et al. |
| 6,999,956 B2 | 2/2006 | Mullins |
| 7,526,490 B2 | 4/2009 | Doughan |

(Continued)

OTHER PUBLICATIONS

King et al. "Hibernate Reference Documentation 3.3.2.GA" published Jun. 24, 2009. Available at http://docs.jboss.org/hibernate/orm/3.3/reference/en-US/html/. Labelled A015 NPL Hibernate.*

(Continued)

*Primary Examiner* — Charles Rones
*Assistant Examiner* — Nanci Wong
(74) *Attorney, Agent, or Firm* — Tucker Ellis LLP

(57) ABSTRACT

Systems and methods are provided to support multitenant data in an EclipseLink environment. EclipseLink supports shared multitenant tables using tenant discriminator columns, allowing an application to be re-used for multiple tenants and have all their data co-located. Tenants can share the same schema transparently, without affecting one another and can use non-multitenant entity types as per usual. This functionality is flexible enough to allow for its usage at an Entity Manager Factory level or with individual Entity Manager's based on the application's needs. Support for multitenant entities can be done though the usage of a multitenant annotation or <multitenant> xml element configured in an eclipselink-orm.xml mapping file. The multi-tenant annotation can be used on an entity or mapped superclass and is used in conjunction with a tenant discriminator column or <tenant-discriminator-column> xml element.

20 Claims, 5 Drawing Sheets

(56) References Cited

U.S. PATENT DOCUMENTS

| | | | |
|---|---|---|---|
| 7,536,409 B2 | 5/2009 | Barcia | |
| 7,565,376 B2 | 7/2009 | Stegmann et al. | |
| 7,653,651 B1 | 1/2010 | Pavlov | |
| 7,689,535 B2 | 3/2010 | Bernard | |
| 7,694,293 B2 | 4/2010 | Rao | |
| 7,702,649 B1 | 4/2010 | Bresch et al. | |
| 7,739,223 B2 | 6/2010 | Vaschillo et al. | |
| 7,870,146 B2 | 1/2011 | Babb et al. | |
| 7,873,611 B2 | 1/2011 | Ebersole | |
| 7,984,082 B2 | 7/2011 | Heider et al. | |
| 8,260,643 B2 | 9/2012 | Benayon et al. | |
| 8,261,295 B1 | 9/2012 | Risbood | |
| 8,266,576 B1 | 9/2012 | Lam et al. | |
| 8,671,404 B2 | 3/2014 | DeHaan et al. | |
| 8,706,800 B1 | 4/2014 | Ahmed et al. | |
| 9,274,811 B1 | 3/2016 | Reeves | |
| 2003/0046266 A1 | 3/2003 | Mullins et al. | |
| 2003/0110279 A1 | 6/2003 | Banerjee et al. | |
| 2003/0163809 A1 | 8/2003 | Bantz | |
| 2005/0234931 A1* | 10/2005 | Yip et al. | 707/100 |
| 2005/0262475 A1 | 11/2005 | Halpern | |
| 2005/0262499 A1 | 11/2005 | Read | |
| 2006/0026168 A1 | 2/2006 | Bosworth | |
| 2006/0294493 A1 | 12/2006 | Melby | |
| 2007/0198564 A1 | 8/2007 | Blackstone et al. | |
| 2007/0271210 A1* | 11/2007 | Heider | G06F 9/4435 |
| 2007/0288892 A1 | 12/2007 | Foti | |
| 2008/0127162 A1 | 5/2008 | Xu | |
| 2008/0162483 A1* | 7/2008 | Becker | G06F 17/30575 |
| 2008/0320441 A1 | 12/2008 | Ahadian et al. | |
| 2008/0320467 A1 | 12/2008 | Bojjireddy | |
| 2009/0112908 A1 | 4/2009 | Wintel et al. | |
| 2009/0276784 A1 | 11/2009 | Grieve | |
| 2009/0281982 A1 | 11/2009 | Nigul et al. | |
| 2010/0122239 A1 | 5/2010 | Neufeld et al. | |
| 2010/0161648 A1 | 6/2010 | Eberlein et al. | |
| 2010/0287208 A1 | 11/2010 | Mao et al. | |
| 2011/0083069 A1 | 4/2011 | Paul | |
| 2011/0145194 A1 | 6/2011 | Figus et al. | |
| 2011/0153576 A1 | 6/2011 | Figus | |
| 2011/0154253 A1 | 6/2011 | Lehr et al. | |
| 2011/0321010 A1 | 12/2011 | Wang | |
| 2012/0023067 A1 | 1/2012 | Clegg et al. | |
| 2012/0166389 A1* | 6/2012 | Shiozawa | G06F 17/30088 707/610 |
| 2012/0284234 A1 | 11/2012 | Mashtizadeh et al. | |
| 2012/0324419 A1 | 12/2012 | Roberts et al. | |
| 2013/0117346 A1 | 5/2013 | Figus | |
| 2013/0219060 A1 | 8/2013 | Sturgeon et al. | |

OTHER PUBLICATIONS

Rekadze et al. "Developers Guide for Oracle TopLink, 11g Release 1" published Sep. 2008. Available at http://docs.oracle.com/cd/E15051_01/index.htm. Labelled A025 NPL Oracle Toplink.*

RSoffiato et al. "Using Existing Hibernate Data Models and Multi-Tenant plugin" published 20 Sep 2010. Available at http://grails.1312388.n4.nabble.com/Using-Existing-Hibernate-Data-Models-Multi-Tenantplugin- td2547659.html. Labelled.*

United States Patent and Trademark Office, Office Action Dated May 10, 2016 for U.S. Appl. No. 13/332,166, 20 Pages.

Wikipedia, "Hash Table" Mar. 9, 2011, Downloaded From the Wayback Machine Internet Archive <url>: http://web.archive.org/web/20110309071409/http://en.wikipedia.org/wiki/Hash_table, pp. 1-12.

Wikipedia, "XML" Mar. 4, 2011, Downloaded From the Wayback Machine Internet Archive <url>: http://web.archive.org/web/20110304182527/http://en.wikipedia.org/wiki/XML, pp. 1-13.

Wikipedia, "XML Data Binding" May 31, 2010, Downloaded From the Wayback Machine Internet Archive <url>: http://web.archive.org/web/20100531060546/http://en.wikipedia.org/wiki/XML_data_binding, pp. 1-2.

United States Patent and Trademark Office, Office Action Dated Aug. 25, 2016 for U.S. Appl. No. 13/332,166, 19 Pages.

Mietzner et al., "Variability Modeling to Support Customization and Deployment of Multi-Tenant-Aware Software As a Service Applications", PESOS'09, May 18-19, 2009, Vancouver, Canada, ICSE'09 Workshop, © 2009 IEEE, 8 Pages.

Guo et al., "A Framework for Native Multi-Tenancy Application Development and Management", The 9th IEEE International Conference on E-Commerce Technology and the 4th IEEE International Conference on Enterprise Computing, E-Commerce and E-Services (CEC-EEE 2007) © 2007 IEEE, 8 Pages.

Kwok et al., "A Software As a Service Wtih Multi-Tenancy Support for an Electronic Contract Management Application", 2008 IEEE International Conference on Services Computing, © 2008 IEEE, pp. 179-186.

* cited by examiner

```
@Entity
@Table(name="EMP")
@Multitenant(SINGLE_TABLE)
@TenantDiscriminatorColumn(name = "TENANT_ID", contextProperty = "tenant-id")
public class Employee {

}
```

302
304

300

306

310

| EMP_ID | VERSION | F_NAME | L_NAME | GENDER | TENANT_ID |
|--------|---------|--------|--------|--------|-----------|
| 1 | 1 | John | Doe | M | 1    312 |
| 2 | 3 | Jane | Doe | F | 2    314 |

SYSTEMS AND METHODS FOR MULTITENANCY DATA

CLAIM OF PRIORITY

This application claims benefit to the following U.S. Provisional Patent Application: U.S. Provisional Patent Application No. 61/542,001 entitled "SYSTEMS AND METHODS FOR MULTITENANCY DATA," by Guy Pelletier et al., filed Sep. 30, 2011.

FIELD OF INVENTION

The present invention is generally related to an application server environment and to the storage of data in the application server environment, and is particularly related to systems and methods for multitenancy data.

BACKGROUND

EclipseLink is an object-persistence and object-transformation framework that provides development tools and run-time capabilities which can reduce development and maintenance efforts, and increase enterprise application functionality. An implementation of the Java Persistence API (JPA) framework is provided by Eclipselink, which enables java classes and objects to be stored in data sources, allowing information to be used across sessions. Using EclipseLink, software applications can be built which store persistent object-oriented data in a relational database; and can be used to transform object-oriented data into either relational data or Extensible Markup Language (XML) elements.

Applications developed using EclipseLink can be configured to support multitenancy. In multitenant applications, multiple different users (i.e. tenants) can utilize the application. These different users may represent varied businesses with particular needs. A software application may be developed generically, with several default properties or attributes which are broadly applicable to many users. However, these default properties may be insufficient to adequately capture all of the data relevant to a particular user. Data for each tenant needs to be stored such that it remains tenant-specific, while not requiring complete reconfiguration of the multitenant system when tenants are added or removed.

SUMMARY

EclipseLink supports shared multitenant tables using tenant discriminator columns, allowing an application to be re-used for multiple tenants and have all their data co-located. Tenants can share the same schema transparently, without affecting one another and can use non-multitenant entity types as per usual. This functionality is flexible enough to allow for its usage at an Entity Manager Factory level or with individual Entity Manager's based on the application's needs.

Support for multitenant entities can be done though the usage of a @Multitenant annotation or <multitenant> xml element configured in an eclipselink-orm.xml mapping file. The @Multitenant annotation can be used on an @Entity or @MappedSuperclass and is used in conjunction with the @TenantDiscriminatorColumn or <tenant-discriminator-column> xml element.

The tenant discriminator column defines the tenant identifying database column and there can be one or more tenant discriminator columns. These columns can be unmapped or mapped. When mapped, they must be marked as read-only. When a multitenant entity is specified, the tenant discriminator column can default. For example default values can include: name=TENANT_ID (the database column name); and context property=tenant.id (the context property used to populate the database column). The context property is a value that is used at runtime to access the specific rows for a tenant. This value is configured at the persistence unit or persistence context, and if not specified a runtime exception will be thrown when attempting to query or modify a multitenant entity type.

BRIEF DESCRIPTION OF THE FIGURES

FIG. 3 shows a multitenant annotation usage, in accordance with an embodiment.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

EclipseLink supports shared multitenant tables using tenant discriminator columns, allowing an application to be re-used for multiple tenants and have all their data co-located. Tenants can share the same schema transparently, without affecting one another and can use non-multitenant entity types as per usual. This functionality is flexible enough to allow for its usage at an Entity Manager Factory level or with individual Entity Manager's based on the application's needs.

Support for multitenant entities can be done though the usage of a @Multitenant annotation or <multitenant> xml element configured in an eclipselink-orm.xml mapping file. The @Multitenant annotation can be used on an @Entity or @MappedSuperclass and is used in conjunction with the @TenantDiscriminatorColumn or <tenant-discriminator-column> xml element.

The tenant discriminator column defines the tenant identifying database column and there can be one or more tenant discriminator columns. These columns can be unmapped or mapped. When mapped, they must be marked as read-only. When a multitenant entity is specified, the tenant discriminator column can default. For example default values can include: name=TENANT_ID (the database column name);

and context property=tenant.id (the context property used to populate the database column). The context property is a value that is used at runtime to access the specific rows for a tenant. This value is configured at the persistence unit or persistence context, and if not specified a runtime exception will be thrown when attempting to query or modify a multitenant entity type.

Figure 1:
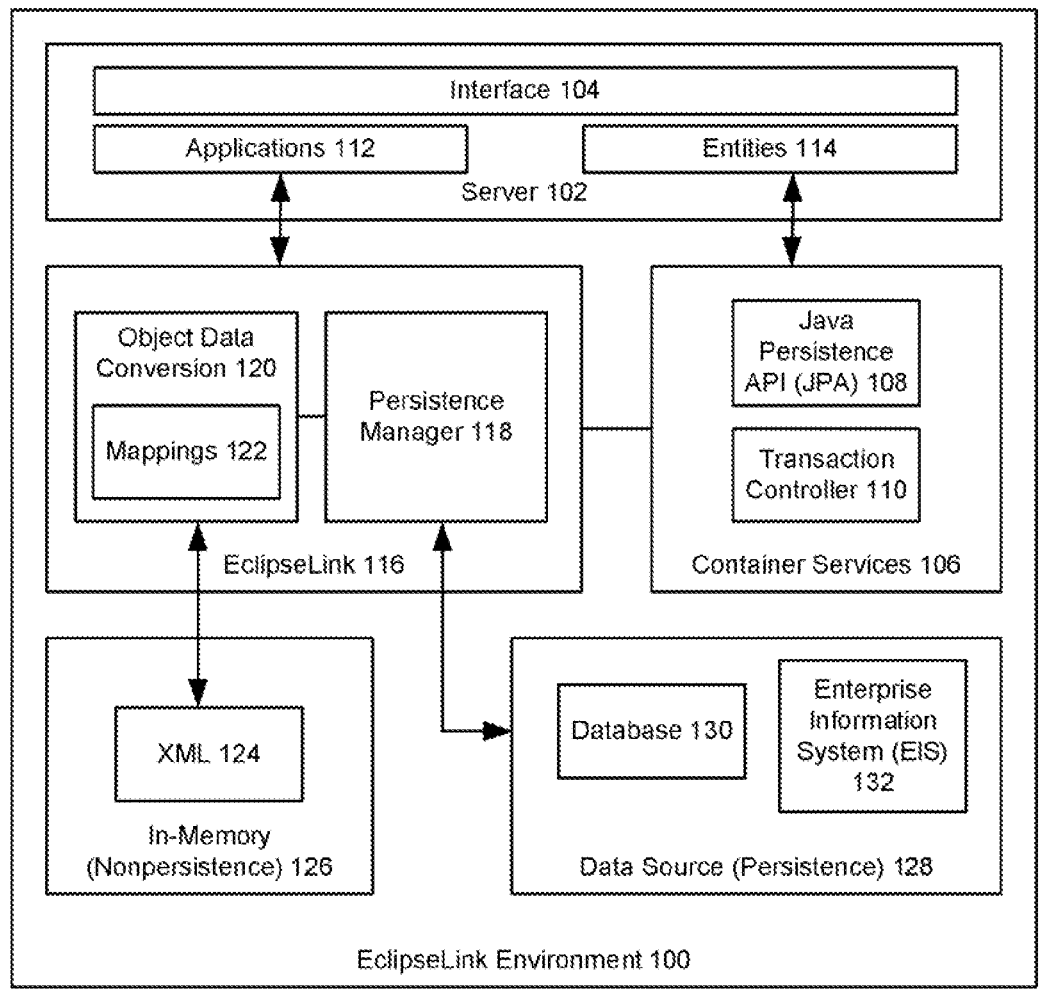
FIG. 1 shows a block diagram of an EclipseLink environment, in accordance with an embodiment.

FIG. 1 shows an illustration of an EclipseLink environment, in accordance with an embodiment. As noted above, persistent applications can be developed using EclipseLink. As shown in FIG. 1, the EclipseLink environment 100 can include a server 102, which includes an interface 104 through which the EclipseLink environment can be accessed, and a plurality of container services 106 such as an implementation of the Java Persistence API (JPA) 108 and a transaction controller 110. The implementation of the Java Persistence API (JPA) framework, provided by EclipseLink, enables applications 112 to define objects that are to be made persistent. In JPA, these application-defined objects are called entities 114. Entities have persistent identities (i.e., instances can be uniquely identified and distinguished from one another); and are transactional (i.e., an entity is created, updated and deleted within a transaction, and a transaction is required for the changes to be committed in the database). However, in-memory entities can be changed without the changes being persisted. Additionally, an entity is a fine-grained object that has a set of aggregated state that is typically stored in a single place (such as a row in a table), and has relationships to other entities.

Entities can be described using metadata, which can be expressed as annotations (specifically defined types that can be attached to or placed in front of Java programming elements) or in XML (descriptors). An entity manager enables API calls to perform operations on an entity. Until an entity manager is used to create, read, or write an entity, the entity is just a regular nonpersistent object. When an entity manager obtains a reference to an entity, that entity becomes managed by the entity manager. The set of managed entity instances within an entity manager at any given time is called its persistence context. The entity manager can be configured to persist or manage certain types of objects and read or write to a particular data source. Entity managers can be provided by an entity manager factory which can be configured by a persistence unit. Persistence units can be named to allow differentiation between the entity manager factory objects with which they are associated. This way an application obtains control over which configuration to use for operations on a specific entity. Persistence units can be defined in a persistence.xml file.

The EclipseLink environment also includes a persistence manager 118 and an object data conversion module 120, and can be used with a variety of Java architectures. As shown in FIG. 1, a plurality of mappings 122 can be maintained to XML representations 124 stored in memory 126. The persistence manager can communicate with one or more data sources 128 such as a database 130 or Enterprise Information System (EIS) 132. Relational databases can be used for transactional persistence of Java objects using Java Database Connectivity (JDBC) drivers. An EIS can be used for transactional persistence of Java objects to a nonrelational data source accessed using a Java EE Connector architecture (JCA) adapter, and any supported EIS record type, including indexed, mapped, or XML.

Persistence Usage for Multiple Tenants

There are multiple usage options available for how an EclipseLink JPA persistence unit can be used in an application with multitenant entity types. Since different tenants have access limited to its own rows the persistence layer is configured so that entities from different tenants do not end up in the same cache.

In accordance with an embodiment, a dedicated persistence unit can be defined for each tenant. In this usage there is a persistence unit defined per tenant and the application requests the correct PersistenceContext or PersistenceUnit for its tenant. This can be used through container managed or application bootstrapped JPA. See Listing 1, below.

Listing 1.

```xml
<source lang="xml">
<persistence-unit name="mysports-OSL">
...
<properties>
<property name="eclipselink.tenant-id" value="OSL"/>
...
</properties>
</persistence-unit>
</source>
```

In accordance with an embodiment, a persistence context can be defined for each tenant. Using a single persistence unit definition in the persistence.xml and a shared persistence unit (EntityManagerFactory and cache), the tenant context can be specified per persistence context (EntityManager) at runtime using the createEntityManager(Map) API. This approach can be used with @PersistenceUnit injection but not with container managed @PersistenceContext injection.

When using this architecture there is a shared cache available for regular entity types but the Multitenant types are protected in the cache, so the MULTITENANT_SHARED_EMF property is set to true. For example: <property name="eclipselink.multitenant.tenants-share-cache" value="true"/>

Additionally, in accordance with an embodiment, a single persistence unit can be defined in the persistence.xml and through use of the application bootstrap API, new persistence contexts with their own caches are created per tenant. The eclipselink.session-name property is provided to ensure a unique server session and cache is provided for each tenant.

The above-mentioned persistence unit options are summarized in Table 1.

TABLE 1

| Usage | @PersistenceContext EntityManager Injection | @PersistenceUnit EntityManagerFactory Injection | Persistence.createEntityManagerFactory Application Bootstrap API |
|---|---|---|---|
| Dedicated | Yes | Yes | Yes |
| Persistence Context per Tenant | No | Yes | Yes |
| Persistence Unit per Tenant | No | No | Yes |

Multitenant Environment

Figure 2:
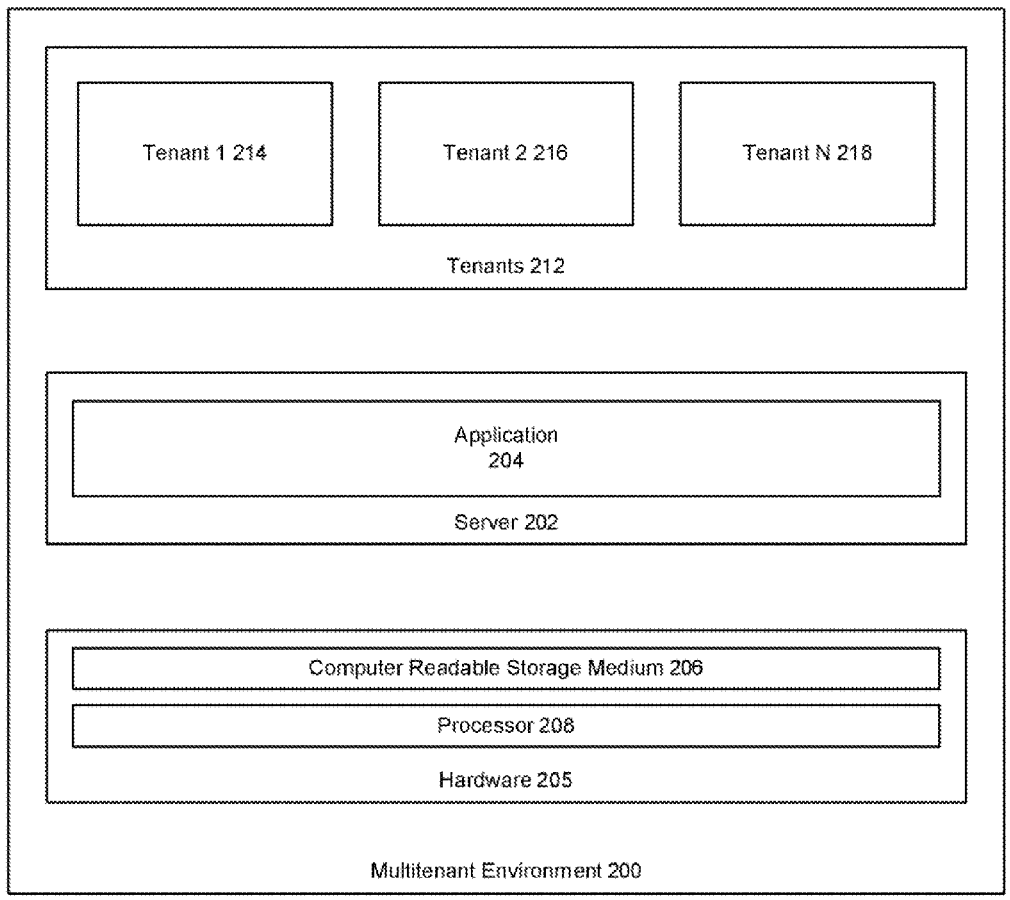
FIG. 2 shows a multitenant environment, in accordance with an embodiment.

FIG. 2 shows a multitenant environment, in accordance with an embodiment. As shown in FIG. 2, the multitenant environment 200 can include a server 202 which hosts and provides access to an application 204. The multitenant environment can further include hardware 205, including a computer readable storage medium 206 and processor 208. In a multi-tenant system, multiple different tenants 212 (i.e., clients) can use the application. For example, a shown in FIG. 2 a plurality of tenants (Tenant 1 214, Tenant 2 216 to Tenant N 218) can each utilize the application at the server. The application can include one or more real properties which are available to all of the tenants. However, each tenant can utilize the application differently, and can require more or less information than is made available by default by the application. Accordingly, one or more virtual properties can be used to define additional, tenant-specific properties at runtime. These virtual properties can be defined in one or more metadata files associated with the tenant.

In accordance with an embodiment, multiple application tenants can share the same schema using tenant discriminator columns. This can be used for shared (i.e., 'striped') database data, where data from different tenants is stored in the same database table.

In accordance with an embodiment, shared multi-tenant entity types can be configured using EclipseLink specific annotations and/or eclipselink-orm.xml with the XML overriding the annotation. Database queries can be automatically augmented to limit query results to the tenant discriminator values provided as property values. This can ensure that operations (i.e., insert, update, delete) for a particular tenant populate and limit their effect to the defined tenant discriminator columns. Additionally, accessing shared data at either the EntityManagerFactory or EntityManager is supported. When using EMF the underlying cache must be unique to the provided tenant discriminator values. The tenant discriminator columns can be either un-mapped or mapped and schema generation of specified tenant discriminator columns is also supported.

Metadata Configuration

In accordance with an embodiment, the single table multitenant strategy can enable shared tenant table usage at the entity level using one or more columns associated with persistence unit or context property values that are provided by the user. In the single table strategy, the table or tables (such as the Table and the SecondaryTable) for a particular entity are shared (i.e., striped) among tenants. The multi-tenant strategy can be specified as single table using a SINGLE_TABLE type, which can be used in conjunction with tenant discriminator columns. Each tenant discriminator column can be defined by the application. A user can pick any property or column name they wish or use Eclipselink-defined defaults. There is no limit on the number of tenant discriminator columns an application can configure.

In accordance with an embodiment, multi-tenant metadata can only be applied at the root level of the inheritance hierarchy when using a single table or joined inheritance strategy. A log warning will be issued otherwise. Additionally, multi-tenant metadata can be specified within a table per class inheritance hierarchy.

Annotation Usage

FIG. 3 shows a multitenant annotation usage, in accordance with an embodiment. As shown in FIG. 3, an entity 300 can be created which can be utilized by multiple tenants. This can be specified using a multitenant annotation 302. In the example shown in FIG. 3, the multitenant strategy is set as single table, that is data for multiple tenants can be stored in one table. A tenant discriminator column can be defined using another annotation 304. The tenant discriminator column differentiate among data stored in the table for different tenants. Based on the entity definition, a single table can be created and populated 306. The single table can include a plurality of columns 308 associated with various properties of the entity. For example, in FIG. 3 the entity includes an Employee class with properties such as First Name, Last Name, and Employee ID. The tenant discriminator column 310 specifies which data corresponds to which tenant, in this case by specifying tenant 1 312 or tenant 2 314. Although this example shows data corresponding to two tenants, it is understood that any number of columns and tenants are possible, and the table can be tailored for each individual application and entity.

In accordance with an embodiment, a multitenant annotation can be specified at the entity or mapped superclass level, to enable multi-tenancy for that entity. Based on multi-tenant type (specified by the multitenant annotation), one or more related annotations (e.g. @TenantDiscriminatorColumn) can be determined and processed accordingly. Multitenant metadata can be applied at the mapped superclass level. When applied at this level it is applied to all sub-entities unless they specify their own multi-tenant metadata.

In accordance with an embodiment, multi-tenancy and its companion annotations are homogeneous and continue to be so when new types are included. For example, Listing 2 shows a mapped superclass which specifies a multitenant type, using the @Multitenant annotation, as well as a related annotation @TenantDiscriminatorColumn.

Listing 2.

```
@MappedSuperclass
@Multitenant(SINGLE_TABLE)
@TenantDiscriminatorColumn(name = "TENANT_ID")
@TenantTableDiscriminator(...)
public MySuperclass {
}
```

Thus, any subclasses of this superclass that do not separately define their own @Multitenant annotation will default to values shown in Listing 3.

Listing 3.

```
@Multitenant(SINGLE_TABLE)
@TenantDiscriminatorColumn(name = "TENANT_ID")
```

In accordance with an embodiment, related annotations which do not apply to subclasses or sub-entities can be ignored. For example, the @TenantTableDiscriminator metadata can be ignored and not be applied to sub-entities that define @Multitenant to be table-per-tenant.

Similarly, in accordance with an embodiment, if a subclass or sub-entity does not separately define its own metadata annotation, any related annotations will also be ignored and replaced with a default based on the superclass. For example, in the example shown in Listing 4, MyEntity's @TenantDiscriminatorColumn is ignored and the defaults apply to the @Multitenant specification from MySuperclass (where the tenant discriminator column is not specified, and is therefore set to a default value).

Listing 4.

```
@MappedSuperclass
@Multitenant(SINGLE_TABLE)
public MySuperclass {
}
@Entity
@TenantDiscriminatorColumn(name = "T_ID",
contextProperty = "my.tenant.id")
public MyEntity {
}
```

Figure 4:
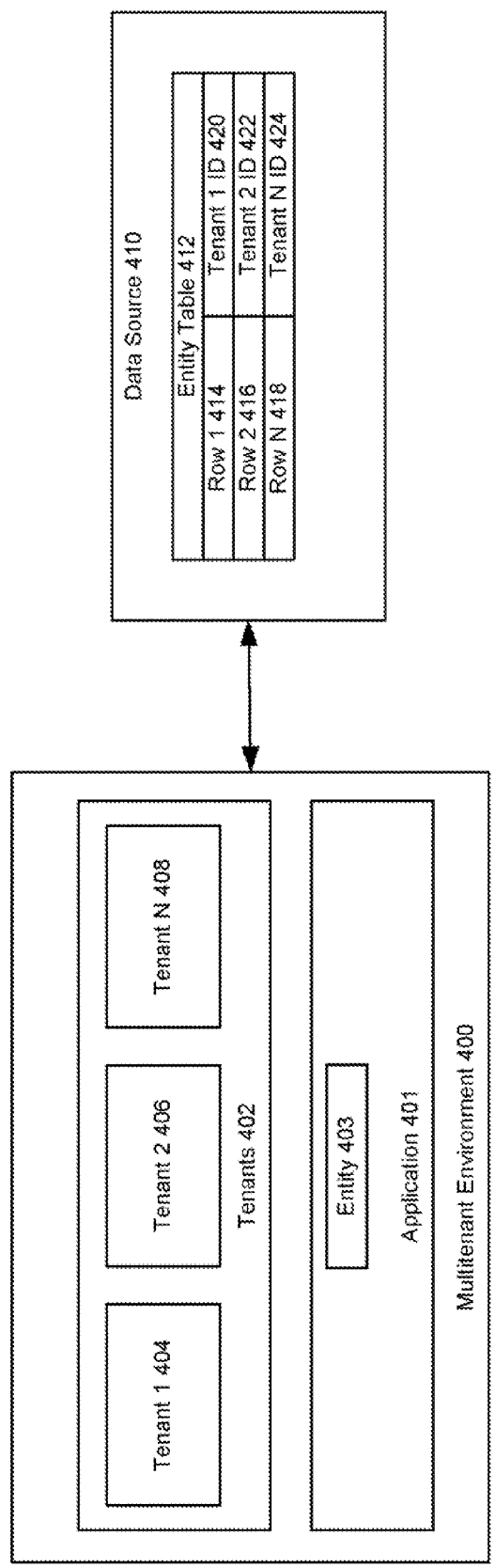
FIG. 4 shows a multitenant system, in accordance with an embodiment.

FIG. 4 shows a multitenant system, in accordance with an embodiment. As shown in FIG. 4, a multitenant environment 400 can include an application 401 and a plurality of tenants 402. The application can include one or more entities 403 which can be utilized by the plurality of tenants, such as tenants 1-N (404, 406, 408). Each of the tenants can specify whether it supports multitenancy using annotations, as described above. For those that do support multitenancy, data from each of the tenants which utilize that entity can be stored together in data source 410 in the same table 412, associated with the entity. Each row of the table (414, 416, 418) corresponds to a different tenant and can include a plurality of columns each for a different attribute or property of the entity. To ensure that each tenant can only access their own data, one or more tenant discriminator columns can be defined, as described above. In this example, a single tenant discriminator column has been defined, each row of which includes a tenant ID (420, 422, 424) associated with a particular tenant. Using the tenant discriminator column, data from multiple different tenants can be co-located in the same table for a particular entity.

Figure 5:
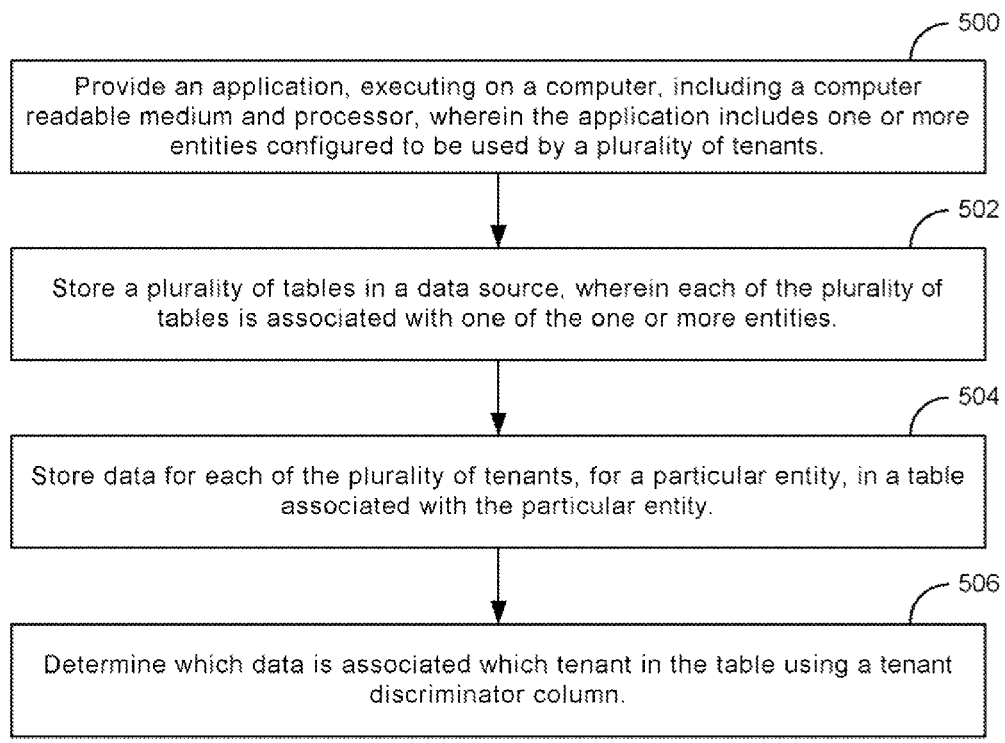
FIG. 5 shows a method of storing multitenant data in a multitenant system, in accordance with an embodiment.

FIG. 5 shows a method of storing multitenant data in a multitenant system, in accordance with an embodiment. At step 500, an application, executing on a computer, including a computer readable medium and processor, is provided. The application includes one or more entities configured to be used by a plurality of tenants. At step 502, a plurality of tables are stored in a data source. Each of the plurality of tables is associated with one of the one or more entities. At step 504, data for each of the plurality of tenants, for a particular entity, is stored in a table associated with the particular entity. At step 506, it is determined which data is associated which tenant in the table using a tenant discriminator column.

In accordance with an embodiment, the method show in FIG. 5 can further include associating each of a plurality of persistence units with a different tenant, configured to prevent entities from different tenants to be stored in the same cache. Alternatively, a persistence context can be shared among the plurality of tenants, wherein the persistence context is associated with a single persistence unit. In another embodiment, each of a plurality of persistence contexts can be associated with a different tenant, wherein the plurality of persistence contexts are provided by a single persistence unit. Each table can include one or more tenant discrimination columns, defined by its associated entity. Additionally, each entity specifies whether it supports multitenancy using a multitenant annotation.

ANNOTATION DEFINITIONS

In accordance with an embodiment, a plurality of annotations can be used to specify different properties of a multitenant system. For example, a multitenant type annotation can specify the multitenant strategy being used, such as single table or table-per-tenant. In a single table strategy, each tenant can map to a different row of the table. Tenant discriminator column(s) can be used with application context values to limit what a persistence context can access. In a table-per-tenant strategy, different tables are used for each tenant and can be identified by name and/or schema/tablespace.

A tenant discriminator column annotation can specify the name of a column in the table which is used as the discriminator (i.e., the column which identifies which data applies to which tenants). A tenant ID annotation can specify the name of a context property applied to the discriminator column. A discriminator type annotation can be used to specify a type of object or column that can be used as a class discriminator. By default, this property can be set to string. An annotation can also be used to set the SQL fragment that can be used when generating the DDL for the discriminator column. Defaults to the provider-generated SQL to create a column of the specified discriminator type. An annotation can also be used to specify the column length for string-based discriminator types. This property is ignored for other discriminator types.

Additionally, the name of the table that includes the discriminator column can be specified in an annotation. A Boolean property which specifies whether the tenant discriminator column is part of the primary key definition of the table can also be specified in an annotation.

XML Usage

In accordance with an embodiment, the multitenant metadata in XML can be available within the entity and mapped superclass elements.

Minimal Configuration

In accordance with an embodiment, a multitenant annotation or tag (i.e., @Multitenant or <multitenant>) can be specified to enable multi-tenancy. All parts of the multitenant and tenant discriminator metadata can be set to default values, without any additional information being specified. Therefore, one example of the minimal configuration is shown in Listing 5.

Listing 5.

```
@Entity
@Table(name="EMP")
@Multitenant
public Employee( ) {
  ...
}
```

A similar configuration is shown below in Listing 6, however this configuration is not a minimal configuration and multi-tenancy is not enabled, because the multitenant annotation is not specified for the class. Since multi-tenancy is not enabled, the @TableDiscriminator annotation is ignored.

Listing 6.

```
@Entity
@Table(name="EMP")
@TenantDiscriminatorColumn
public Employee( ) {
  ...
}
<entity class="model.Employee">
  <multitenant/>
  <table name="EMP"/>
  ...
</entity>
```

Persistence Unit and Entity Mappings Defaults

Along with the availability from the entity and mapped superclass levels, the multitenant metadata can be available at the following levels to provide defaults: persistence-unit-defaults; and entity-mappings. Usage at the these levels follows similar JPA metadata defaulting and overriding rules.

Persistence-Unit-Defaults

In accordance with an embodiment, in the eclipselink-orm.xml, it is possible to specify default tenant discriminator column metadata through the persistence unit metadata defaults. When defined at this level, it can be applied to all entities of the persistence unit that have specified a multi-tenant type of single table minus those that specify their own tenant discriminator metadata. With no defaults, an entity not marked with multi-tenant metadata will not use any multi-tenancy strategy. An example is shown below in Listing 7.

Listing 7.

```
<xsd:complexType name="persistence-unit-defaults">
...
<xsd:sequence>
...
<xsd:element name="tenant-discriminator-column"
type="orm:tenant-discriminator-column" minOccurs="0"
maxOccurs="unbounded"/>
...
</xsd:sequence>
</xsd:complexType>
```

Entity-Mappings

Alternatively, users can specify tenant discriminator column metadata at the entity-mappings level, which overrides a persistence unit default and applies itself to all entities with a multitenant type of single table of the given mapping file (unless an individual entity has specified its own tenant discriminator metadata). An example is shown below in Listing 8.

Listing 8.

```
<xsd:element name="entity-mappings">
...
<xsd:sequence>
...
<xsd:element name="tenant-discriminator-column"
type="orm:tenant-discriminator-column" minOccurs="0"
maxOccurs="unbounded"/>
...
</xsd:sequence>
</xsd:complexType>
```

Mapped vs. Unmapped Tenant Discriminator

In accordance with an embodiment, when a tenant discriminator column is mapped, its associated mapping attribute can be marked as read only. If it is not, an exception can be raised. With this restriction in place, a tenant discriminator column can not be part of the entity identifier (it can only be part of the primary key specification on the database, see the annotation definition above). On persist, the value of the mapped tenant discriminator column mapping is populated from its associated context property. Both mapped and unmapped properties can be used to form the additional criteria when issuing a select query. Unmapped tenant discriminator columns can use EclipseLink to populate the row with the tenant discriminator columns associated context property value.

Property Configuration and Caching Scope

In accordance with an embodiment, at runtime properties can be specified via a persistence unit definition or passed to a create entity manager factory call.

The order of precedence for tenant discriminator column properties is shown in Listing 9.

Listing 9.

```
EntityManager
EntityManagerFactory
Application context (when in a Java EE container)
<persistence-unit name="multi-tenant">
...
<properties>
<property name="tenant.id" value="707"/>
...
</properties>
</persistence-unit>
```

Or alternatively in code as shown in Listing 10.

Listing 10.

```
HashMap properties = new HashMap( );
properties.put("tenant.id", "707");
...
EntityManager   em   =
Persistence.createEntityManagerFactory("multi-tenant",
properties).createEntityManager( );
```

Entity Manager Factory

At this level, users can provide a session name through the "eclipselink.session-name" property to ensure a unique server session (and cache) is provided for each tenant. This allows for user defined properties without any prefixing. An example is shown below in Listing 11.

Listing 11.

```
HashMap properties = new HashMap( );
properties.put("tenant.id", "707");
properties.put("eclipselink.session-name", "multi-tenant-707");
...
EntityManager   em   =
Persistence.createEntityManagerFactory("multi-tenant",
properties).createEntityManager( );
```

Shared Entity Manager Factory

In accordance with an embodiment, when using a shared entity manager factory, no L2 cache "striping" will be performed. The following property can be set to indicate the entity manager factor is shared: eclipselink.multitenant-.tenants-share-cache. When this property is set, all multi-tenant entities will have a PROTECTED cache setting.

Entity Manager

At this level, users can specify the caching strategies, as the same server session can be employed for each tenant. In accordance with an embodiment, users can use an isolation level here to ensure no 'shared' tenant information exists in the L2 cache. These settings can be set when creating the entity manager factory. In accordance with an embodiment, swapping tenant IDs during a live EntityManager is not allowed. An example is shown below in Listing 12.

Listing 12.

```
HashMap tenantProperties = new HashMap( );
properties.put("tenant.id", "707");
HashMap cacheProperties = new HashMap( );
properties.put("eclipselink.cache.shared.Employee", "false");
properties.put("eclipselink.cache.size.Address", "10");
```

Listing 12.

```
properties.put("eclipselink.cache.type.Contract", "NONE");
...
EntityManager em = Persistence.createEntityManagerFactory("multi-
tenant", cacheProperties).createEntityManager(tenantProperties);
...
```

In accordance with an embodiment, the tenant discriminator columns can be initialized during the pre-initialization of each descriptor of the persistence unit. During post-initialization of the descriptor query manager after appending any additional criteria, the tenant discriminator columns can be appended to the additional join expression.

The tenant discriminator column value(s) will be added as arguments when issuing queries.

For inserts, the tenant discriminator columns and values can be appended when building the row representation of an object. This can be done in the following methods from ObjectBuilder, shown in Listing 12.

Listing 13.

```
buildRow
buildRowForShallowInsert
buildRowForUpdate
buildRowWithChangeSet
buildTemplateInsertRow
```

In accordance with an embodiment, when the tenant discriminator column is mapped, it need not be added to the row, instead just its value can be populated. To facilitate read operations on the table which utilize the tenant discriminator columns, read operations, such as ReadObjectQuery and ReadAllQuery, can be modified. In doing so, a translation row can be cloned and the tenant discriminator columns can be appended to it before execution. The tenant discriminator columns are assumed to exist on the primary table. If using secondary tables the tenant discriminator column metadata must specify the table if it is not on the primary. Listing 14 shows a Java example.

Listing 14.

```
EntityManager em = createEntityManager(MULTI_TENANT_PU);
em.setProperty("tenant.id", "707");
em.setProperty(EntityManagerProperties.-
MULTITENANT_PROPERTY_DEFAULT, "707");
```

Querying

In accordance with an embodiment, the tenant discriminator column and value can be used through the following entity manager operations: persist; find; and refresh. Additionally, the following queries are available: named queries; update all; and delete all.

DDL Generation n accordance with an embodiment, data definition language (DDL) generation supports the generation of tenant discriminator columns for all necessary tables. The DDL generation of columns is based off the descriptor's columns. During pre-initialization, tenant discriminator columns are built and added to a list of the descriptor's columns, if they are not mapped columns. This is done after the descriptor table initialization (including inheritance hierarchies) has been performed. Mapped tenant discriminator columns can be added automatically, as shown in Listing 15.

Listing 15

```
if (hasTenantDiscriminatorFields( )) {
  for (DatabaseField discriminatorField:
    tenantDiscriminatorFields.keySet( )){
    getFields( ).add(buildField(discriminatorField));
  }
}
```

DefaultTableGenerator

In accordance with an embodiment, the DDL generator can be modified to ensure a primary key setting is captured for a tenant discriminator column. For example, the following line can be added to the initTableSchema(ClassDescriptor) method: isPKField=isPKField II dbField.isPrimaryKey( );

The present invention can be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting multitenant data in a multitenant system, the method comprising:
configuring a multitenant application to be used by a plurality of tenants, wherein each tenant of the plurality of tenants is associated with a different tenant discriminator value identifying said tenant;
storing data for use by said multitenant application in a table corresponding to an entity defined by said multitenant application such that columns of the table correspond to properties of the entity, wherein said table is a shared multitenant table in which all of said data for all of the plurality of tenants is co-located, and wherein said table holds a plurality of rows of data from each of said plurality of tenants;

providing said table with a tenant discrimination column for holding tenant discriminator values which identify which of said plurality of rows of data held in said table is associated with which particular tenant of the plurality of tenants;

creating a plurality of entity managers including an entity manager for each tenant of said plurality of tenants, wherein the entity manager associated with each tenant of said plurality of tenants is configured with the tenant discriminator value associated with said each tenant of said plurality of tenants by one of the multitenant application or a shared entity manager factory configured to create the plurality of entity managers;

creating a plurality of transactional entity instances, using said multitenant application, for each of said plurality of tenants, wherein each of said plurality of transactional entity instances is associated with a particular row of data of said plurality of rows of data and with a tenant discriminator value used to identify a particular one of said plurality of tenants, and wherein each of said plurality of transactional entity instances is associated with a transaction performed by said multitenant application on said row of data held in said table and identified by the tenant discriminator value associated with said entity instance;

providing a plurality of caches, wherein a different one of said plurality of caches is associated with each particular one of the plurality of tenants; and using each cache to manage transactional entity instances associated with said particular one of said plurality of tenants associated with the cache.

2. The method of claim 1, further comprising:
said multitenant application requesting a particular cache associated with a particular tenant.

3. The method of claim 1, further comprising:
providing said table with a plurality of tenant discrimination columns.

4. The method of claim 1, further comprising:
managing the plurality of transactional entity instances associated with each of said plurality of tenants with the entity manager associated with said each of said plurality of tenants.

5. The method of claim 1, further comprising:
automatically augmenting database queries directed to said table to limit query results based on the tenant discriminator values.

6. The method of claim 1, further comprising:
providing said shared entity manager factory; and wherein the entity manager associated with each tenant of said plurality of tenants is configured with the tenant discriminator value associated with said each tenant of said plurality of tenants by said shared entity manager factory.

7. The method of claim 1, wherein the entity manager associated with each tenant of said plurality of tenants is configured with the tenant discriminator value associated with said each tenant of said plurality of tenants directly by said multitenant application.

8. A non-transitory computer readable storage medium including instructions stored thereon for supporting multitenant data in a multitenant system, which instructions, when executed by a computer, cause the computer to:
configure a multitenant application to be used by a plurality of tenants wherein each tenant of the plurality of tenants is associated with a different tenant discriminator value identifying said tenant;

store data for use by said multitenant application in a table corresponding to an entity defined by said multitenant application such that columns of the table correspond to properties of the entity, wherein said table is a shared multitenant table in which all of said data for all of the plurality of tenants is co-located, and wherein said table holds a plurality of rows of data from each of said plurality of tenants;

provide said table with a tenant discrimination column for holding tenant discriminator values which identify which of said plurality of rows of data held in said table is associated with which particular tenant of the plurality of tenants;

create a plurality of entity managers including an entity manager for each tenant of said plurality of tenants, wherein the entity manager associated with each tenant of said plurality of tenants is configured with the tenant discriminator value associated with said each tenant of said plurality of tenants by one of the multitenant application or a shared entity manager factory configured to create the plurality of entity managers;

create a plurality of transactional entity instances, using said multitenant application, for each of said plurality of tenants wherein each of said plurality of transactional entity instances is associated with a particular row of data of said plurality of rows of data and with a tenant discriminator value used to identify a particular one of said plurality of tenants, and wherein each of said plurality of transactional entity instances is associated with a transaction performed by said multitenant application on said row of data held in said table and identified by the tenant discriminator value associated with said entity instance;

provide a plurality of caches, wherein a different one of said plurality of caches is associated with each particular one of the plurality of tenants; and use each cache to manage transactional entity instances associated with said particular one of said plurality of tenants associated with the cache.

9. The non-transitory computer readable storage medium of claim 8, further including instructions which, when executed by a computer, cause the computer to:
request a particular cache associated with a particular tenant.

10. The non-transitory computer readable storage medium of claim 8, further including instructions which, when executed by a computer, cause the computer to:
provide said table with a plurality of tenant discrimination columns.

11. The non-transitory computer readable storage medium of claim 8, further including instructions which, when executed by a computer, cause the computer to:
manage the plurality of transactional entity instances associated with each of said plurality of tenants with the entity manager associated with said each of said plurality of tenants.

12. The non-transitory computer readable storage medium of claim 8, further including instructions which, when executed by a computer, cause the computer to:
automatically augment database queries directed to said table to limit query results based on the tenant discriminator values.

13. The non-transitory computer readable storage medium of claim 8, further including instructions which, when executed by a computer, cause the computer to:

provide said shared entity manager factory; and wherein the entity manager associated with each tenant of said plurality of tenants is configured with the tenant discriminator value associated with said each tenant of said plurality of tenants by said shared entity manager factory.

14. A multitenant system, comprising:

a microprocessor;

a multitenant application executing on the microprocessor, and configured to be used by a plurality of tenants, wherein each tenant of the plurality of tenants is associated with a different tenant discriminator value identifying said tenant;

a table which holds data corresponding to an entity defined by said multitenant application such that columns of the table correspond to properties of the entity, wherein said table is a shared multitenant table in which all of said data for all of the plurality of tenants is co-located, wherein said table holds a plurality of rows of data from each of said plurality of tenants, and wherein said table comprises a tenant discrimination column holding tenant discriminator values used to identify which of said plurality of rows of data held in said table is associated with which particular tenant of the plurality of tenants;

a plurality of transactional entity instances for each of said plurality of tenants, wherein each of said plurality of transactional entity instances is associated with a particular row of data of said plurality of rows of data and with a tenant discriminator value used to identify a particular one of said plurality of tenants, and wherein each of said plurality of transactional entity instances is associated with a transaction effected by said multitenant application on said particular row of data associated with said transactional entity instance;

a plurality of entity managers comprising an entity manager associated with each tenant of said plurality of tenants wherein each entity manager is configured with the tenant discriminator value associated with each respective tenant of said plurality of tenants by one of the multitenant application or a shared entity manager factory configured to create the plurality of entity managers; and a plurality of caches, wherein a different one of said plurality of caches is associated with each particular one of the plurality of tenants, and wherein each cache is configured to manage transactional entity instances associated with said particular one of said plurality of tenants associated with the cache.

15. The multitenant system of claim 14, wherein said multitenant application is configured to request a particular cache associated with a particular tenant.

16. The multitenant system of claim 14, wherein said table includes a plurality of tenant discrimination columns.

17. The multitenant system of claim 14, wherein the entity manager associated with each of said plurality of tenants is configured to manage the plurality of transactional entity instances associated with said each of said plurality of tenants.

18. The multitenant system of claim 14, wherein database queries directed to said table are automatically augmented to limit query results based on the tenant discriminator values.

19. The system of claim 14, wherein the system comprises the shared entity manager factory and wherein each entity manager is configured with the tenant discriminator value associated with said each respective tenant of said plurality of tenants by the shared entity manager factory.

20. The system of claim 14, wherein each entity manager is configured with the tenant discriminator value associated with each respective tenant of said plurality of tenants directly by the multitenant application.

* * * * *

UNITED STATES PATENT AND TRADEMARK OFFICE
CERTIFICATE OF CORRECTION

PATENT NO. : 9,542,432 B2
APPLICATION NO. : 13/332126
DATED : January 10, 2017
INVENTOR(S) : Pelletier et al.

Page 1 of 1

It is certified that error appears in the above-identified patent and that said Letters Patent is hereby corrected as shown below:

On the Title Page

On page 2, Column 2, item (56) under Other Publications, Line 32, delete "Wtih" and insert -- With --, therefor.

In the Specification

In Column 5, Line 9, delete "a" and insert -- as --, therefor.

In Column 9, Line 2, delete "the these" and insert -- these --, therefor.

In Column 11, Line 60, delete "n accordance" and insert -- In accordance --, therefor.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*